United States Patent
Kasahara et al.

(10) Patent No.: US 6,697,687 B1
(45) Date of Patent: Feb. 24, 2004

(54) IMAGE DISPLAY APPARATUS HAVING AUDIO OUTPUT CONTROL MEANS IN ACCORDANCE WITH IMAGE SIGNAL TYPE

(75) Inventors: Yasuhiro Kasahara, Izumi-ku (JP); Yasuhiro Tomita, Totsuka-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/435,781

(22) Filed: Nov. 8, 1999

(30) Foreign Application Priority Data

Nov. 9, 1998 (JP) .......................... 10-317770

(51) Int. Cl.$^7$ .................. G06F 17/00; H04N 11/00; H04R 5/02; H03G 3/00
(52) U.S. Cl. .................. 700/94; 348/51; 348/552; 348/555; 348/462; 345/716; 345/717; 345/718; 381/306; 381/104
(58) Field of Search .................. 348/43, 46, 51, 348/69, 242, 246, 301, 346, 426, 429, 437, 441, 443, 462, 71, 114, 426.1, 454, 487, 500, 516, 552, 555; 700/94; 381/61, 12; 345/625, 634, 656, 603, 718, 716, 727, 728, 714, 717

(56) References Cited

U.S. PATENT DOCUMENTS

| | | | |
|---|---|---|---|
| 5,400,068 A | * 3/1995 | Ishida et al. | 348/14 |
| 5,453,796 A | * 9/1995 | Duffield et al. | 348/565 |
| 5,877,781 A | * 3/1999 | Tomizawa et al. | 345/521 |
| 5,999,220 A | * 12/1999 | Washino | 348/441 |
| 6,292,618 B1 | * 9/2001 | Ohara et al. | 386/46 |
| 6,370,198 B1 | * 4/2002 | Washino | 375/240.26 |
| 6,522,830 B2 | * 2/2003 | Yamagami | 386/95 |

FOREIGN PATENT DOCUMENTS

JP    9-182003    7/1997

* cited by examiner

*Primary Examiner*—Rexford Barnie
(74) *Attorney, Agent, or Firm*—Mattingly, Stanger & Malur, P.C.

(57) ABSTRACT

An image display apparatus capable of automatically controlling an output status for each of audio information signals inputted with image information signals from various different image sources. A first signal input circuit inputs an image information signal and an audio information signal from a personal computer. A second signal input circuit inputs an image information signal and an audio information signal of a television signal. An image selection circuit selects the first or second signal input circuit. An image conversion circuit converts the selected image information signal to a signal having the number of pixels corresponding to a display circuit. An audio signal selection circuit selects the first or second signal input circuit. An audio signal control circuit controls an output status for the input audio signal. An operation device inputs a setting of the image display apparatus, such as luminance, by user's operation. A control circuit controls the selection circuits and the audio signal control circuit, in accordance with the operation device. A memory circuit is used for storing the setting of the image display apparatus set by the user and the output status for the audio signal. The stored contents are read by the controller, and audio output is controlled by the audio signal control circuit.

4 Claims, 4 Drawing Sheets

FIG. 4

| ADDRESS | DATA | |
|---|---|---|
| 00H | INPUT SIGNAL DATA | FIRST AREA |
| 01H | VOLUME CONTROL DATA (IN PC INPUT) | SECOND AREA (AUDIO CONTROL DATA FOR PC SIGNAL) |
| 02H | (RESERVE) | |
| ⋮ | ⋮ | |
| 0FH | | |
| 10H | VOLUME CONTROL DATA (IN NTSC INPUT) | THIRD AREA (AUDIO CONTROL DATA FOR NTSC SIGNAL) |
| 11H | HIGH-PITCHED TONE CONTROL DATA | |
| 12H | LOW-PITCHED TONE CONTROL DATA | |
| 13H | BALANCE CONTROL DATA | |
| 14H | STEREO MODE CONTROL DATA | |
| 15H | SURROUND-SOUND FUNCTION CONTROL | |
| 16H | (RESERVE) | |
| ⋮ | ⋮ | |
| 19H | | |
| 20H | | |

IMAGE DISPLAY APPARATUS HAVING AUDIO OUTPUT CONTROL MEANS IN ACCORDANCE WITH IMAGE SIGNAL TYPE

BACKGROUND OF THE INVENTION

The present invention relates to an image display apparatus capable of output audio signal control in accordance with image information signal inputs in different signal formats from various different image sources.

In recent years, attention is focused on a so-called multimedia-type image display device which can perform image display based on image information signals outputted from different image sources such as television broadcast and a personal computer.

As a known example, a technique to display an image from a personal computer on a television set generally used in ordinary households is known.

Further, as another example, a technique to display a received television programs on a display device specifically for a personal computer is known. Such image display device is disclosed in, e.g., Japanese Published Unexamined Patent Application No. Hei 9-182003.

With the widespread use of the above-described multimedia type image display device, there is a requirement from users as follows. That is, as audio information signals synchronized with image information signals from different image sources such as television broadcast and a personal computer are to be handled for the users' different purposes, output statuses of the audio information signals must be controlled differently.

For example, in a case where a moving image obtained from a television broadcast signal or obtained by a video software program in a VTR is used as an input image information signal, to output an audio information signal, audio output providing a sense of realism by a large volume, a stereo effect, a surround-sound effect and the like is often required.

On the other hand, in a case where a still image obtained by a personal computer or the like is used as an input signal source, audio output with a sense of realism is not so often required as required in case of television broadcast signal or the like.

In the above conventional art, audio signal control means is provided for controlling an audio information signal output status, however, audio signal control for each image input signal is not taken into consideration. Accordingly, each time an audio information signal inputted into the image display device is selected, the output status of the audio control means must be manually changed.

Recently, by the improvements in sound effect techniques, concert hall- or theater-like realistic audio output can be selected in an ordinary household, or high-pitched tone- or low-pitched tone- emphasized audio output can be selected. Further, such selection can be made in a wider range. accordingly, it is very troublesome to manually set audio signal control appropriate to each image input signal in accordance with the type of the input signal.

SUMMARY OF THE INVENTION

The present invention has its object to provide an image display apparatus capable of automatically controlling an audio signal output status for each of respective audio information signals inputted in synchronization with image information signal inputs in different signal formats from various different image sources.

According to the present invention, the foregoing object is attained by providing an image display apparatus comprising: a display circuit having a specific number of display pixels; an image signal selection circuit that selects an arbitrary one of image information signals in different signal formats as input signals; a signal conversion circuit that converts the image information signal selected by the image signal selection circuit to an image information signal in a signal format corresponding to the display circuit; an audio signal selection circuit that selects an arbitrary one of audio information signals synchronous to the image information signals as input signals; an audio signal control circuit that controls a plurality of audio output statuses for the audio information signal selected by the audio signal selection circuit; a memory circuit that is used for storing and reading the audio output statuses of the audio signal control circuit for the audio information signal; an audio output circuit that outputs the audio information signal controlled by the audio signal control circuit; and a control circuit that stores a control status of the audio signal control circuit into the memory circuit by each audio information signal selected by the audio signal selection circuit, the reads the control status, and controls the audio signal control circuit.

Preferably, at least one of the input image information signals and the audio information signals is an output signal from a personal computer, and another one of the input signals is included in a television broadcast signal.

Regarding audio information signals inputted in synchronization with image information signal inputs in different signal formats from various different image sources, the audio signal control status for each audio information signal is stored into the memory circuit. Then, control data stored in the memory circuit is read by the control circuit for each selected audio information signal. The control circuit controls an audio control circuit based on the read audio control data. Thus, the audio signal output status can be automatically controlled for each selected audio information signal.

Other objects and advantages besides those discussed above shall be apparent to those skilled in the art from the description of a preferred embodiment of the invention which follows. In the description, reference is made to accompanying drawings, which form a part thereof, and which illustrate as example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing a memory map of a memory circuit 13 for storing audio control data.

DETAILED DESCRIPTION OF THE PREFERRED EMBODIMENT

Preferred embodiment of the present invention will now be described in detail in accordance with the accompanying drawings.

Figure 1:
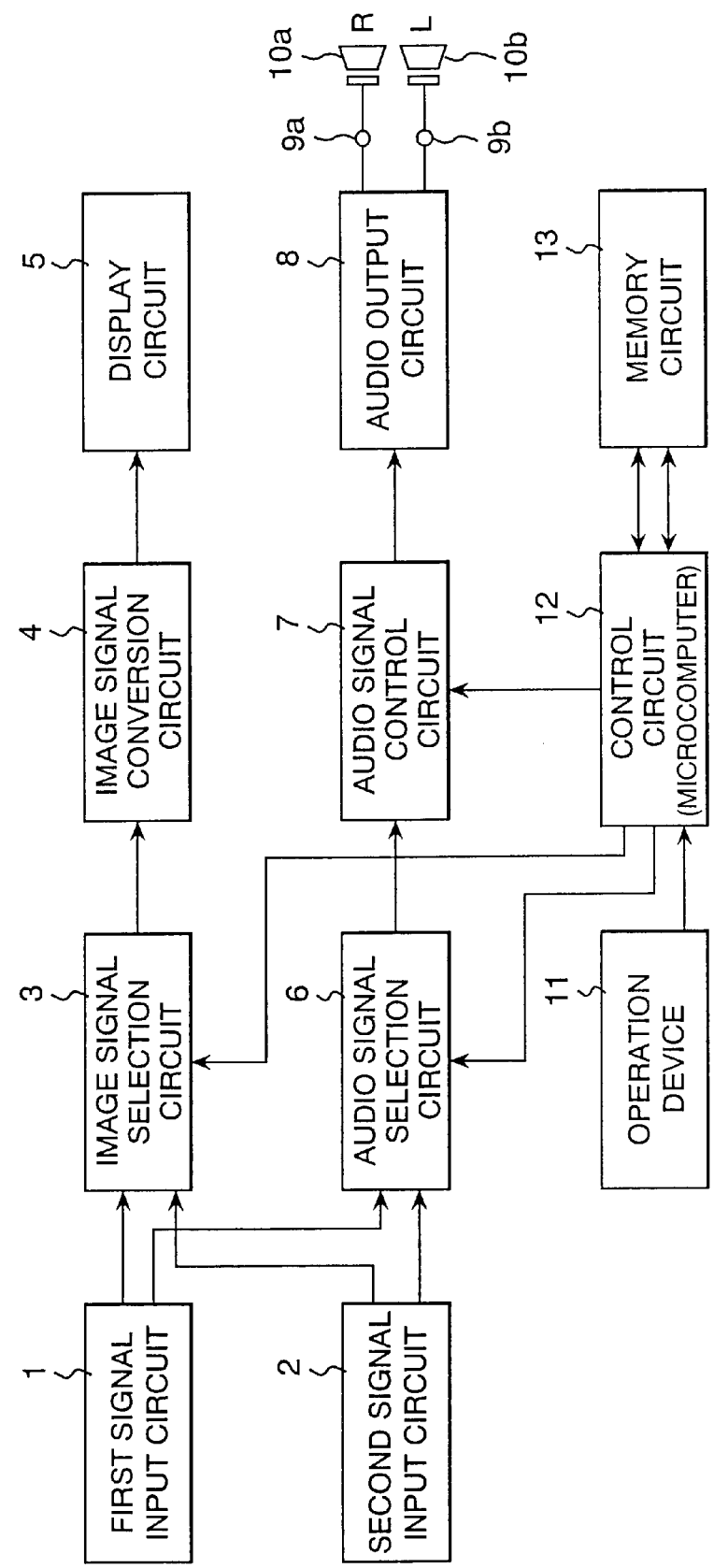
FIG. 1 is a block diagram showing an image display apparatus according to an embodiment of the present invention.

FIG. 1 is a block diagram showing an image display apparatus according to an embodiment of the present invention. In FIG. 1, reference numerals 1 and 2 denote first and second signal input circuits. The first signal input circuit 1 inputs image information signals in VGA, SVGA and XGA signal formats (hereinafter referred to as "personal computer signals") and audio information signals synchronized with these signals. Note that in case of image display apparatus with a built-in personal-computer, a personal computer signal is inputted into the first signal input circuit 1.

On the other hand, the second signal input circuit 2 is provided for signals from a television set and a VTR (both not shown). The second signal input circuit 2 inputs one of standard television signals, an image information signal in NTSC system (hereinafter referred to as an "NTSC signal") and an audio information signal synchronized with the image information signal. Note that in case of image display apparatus with a television reception function, an NTSC signal is inputted into the second signal input circuit 2.

An image selection circuit 3, controlled by a control command from a control circuit (microcomputer) 12, selects one of image information signals inputted into the first signal input circuit 1 and the second signal input circuit 2, and outputs the selected image information signal. An image conversion circuit 4 inputs the image information signal outputted from the image selection circuit 3, performs conversion such that the number of pixels of the input image information signal corresponds to the number of pixels of a display unit 5, and outputs the converted signal. The display unit 5, comprising a TFT liquid crystal panel, a CRT or the like, displays an image based on the image information signal with converted number of pixels from the image conversion circuit 4. In this embodiment, the display unit 5 has the number of pixels corresponding to the XGA format.

Further, an audio signal selection circuit 6, controlled by a control command from the control circuit 12, selects one of audio information signals inputted into the first signal input circuit 1 and the second signal input circuit 2, and outputs the selected audio information signal. An audio signal control circuit 7 inputs the audio information signal outputted from the audio signal selection circuit 6, and controls an audio output status (a volume, high-pitched tone emphasis, low-pitched tone emphasis and the like) for the input audio information signal, in accordance with a control command from the control circuit 12. An audio output circuit 8 drives speakers 10a and 10b. The audio output circuit 8 is not necessarily provided in the image display apparatus.

Numerals 9a and 9b denote audio output terminals connected to the speakers 10a and 10b. Note that the speakers 10a and 10b may be provided as devices independent of the image display apparatus, or may be provided in the image display apparatus. In the example in FIG. 1, only the speakers 10a and 10b for 2 channels are provided in consideration of stereo mode. However, in Dolby prologic audio output, for example, as speakers for 5 channels are required, the number of audio output terminals is 5, and the terminals are connected to 5 speakers.

An operation device 11 is used for inputting settings of the image display apparatus such as selection of input signal source, an audio signal output status and the luminance of the display unit 5, by a user's operation. The operation device 11 comprises a mechanical switch or a remote control device utilizing an infrared light beam.

The control circuit 12 comprises a general-purpose microcomputer or the like. As described above, the control circuit 12 provides control commands to the image signal selection circuit 3, the audio signal selection circuit 6 and the audio signal control circuit 7 and thus controls these circuits. A memory circuit 13, controlled by the control circuit 12, is used for storing the settings of the image display apparatus made by the user. The output statuses for respective audio signals synchronized with the personal computer signal and the NTSC signal are also stored in the memory circuit 13.

In the above-described construction of the image display apparatus, the image signal selection circuit 3 selects one of the image information signals, selected by the user via the operation device 11, from the personal computer signal and the NTSC signal inputted into the signal input circuits 1 and 2. Then, the selected image information signal is inputted into the image signal conversion circuit 4. The image signal conversion circuit 4 converts the number of pixels of the image information signal to that of XGA format. Then, the image signal conversion circuit 4 supplies the converted image information signal to the display unit 5. The display unit 5 displays an image based on the image information signal.

On the other hand, regarding the audio information signal, the audio signal selection circuit 6 selects one of the audio signals, selected by the user via the operation device 11, from the audio information signals respectively synchronized with the personal computer signal and the NTSC signal inputted into the signal input circuits 1 and 2. The selected audio information signal is supplied to the audio signal control circuit 7, and as will be described later, the audio signal is controlled. The audio information signal controlled by the audio signal control circuit 7 is amplified by the audio output circuit 8, and outputted as actual sound from the speakers 10a and 10b.

Figure 2:
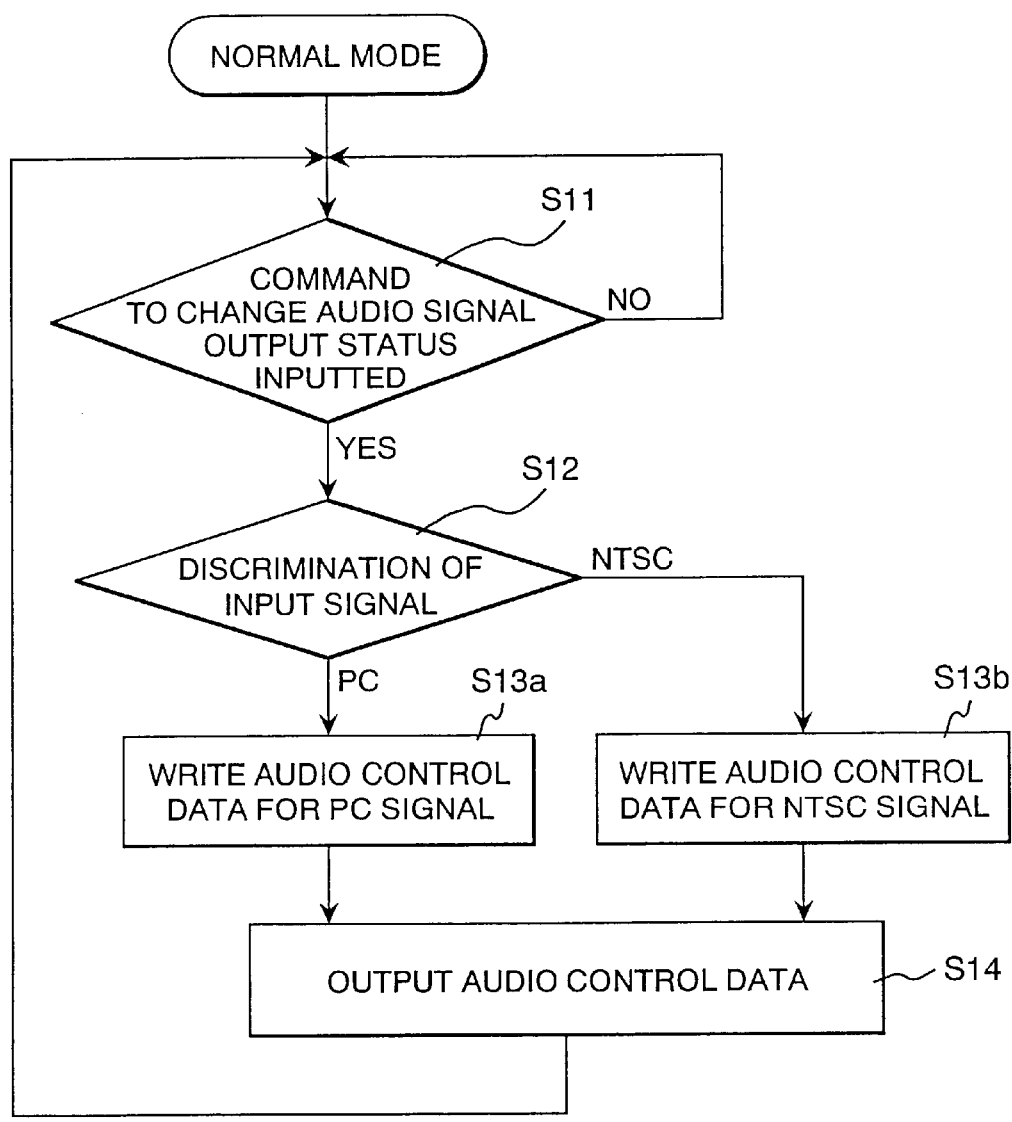
FIG. 2 is a flowchart showing an example of a program for setting the control status of an audio signal control circuit 7.
Figure 3:
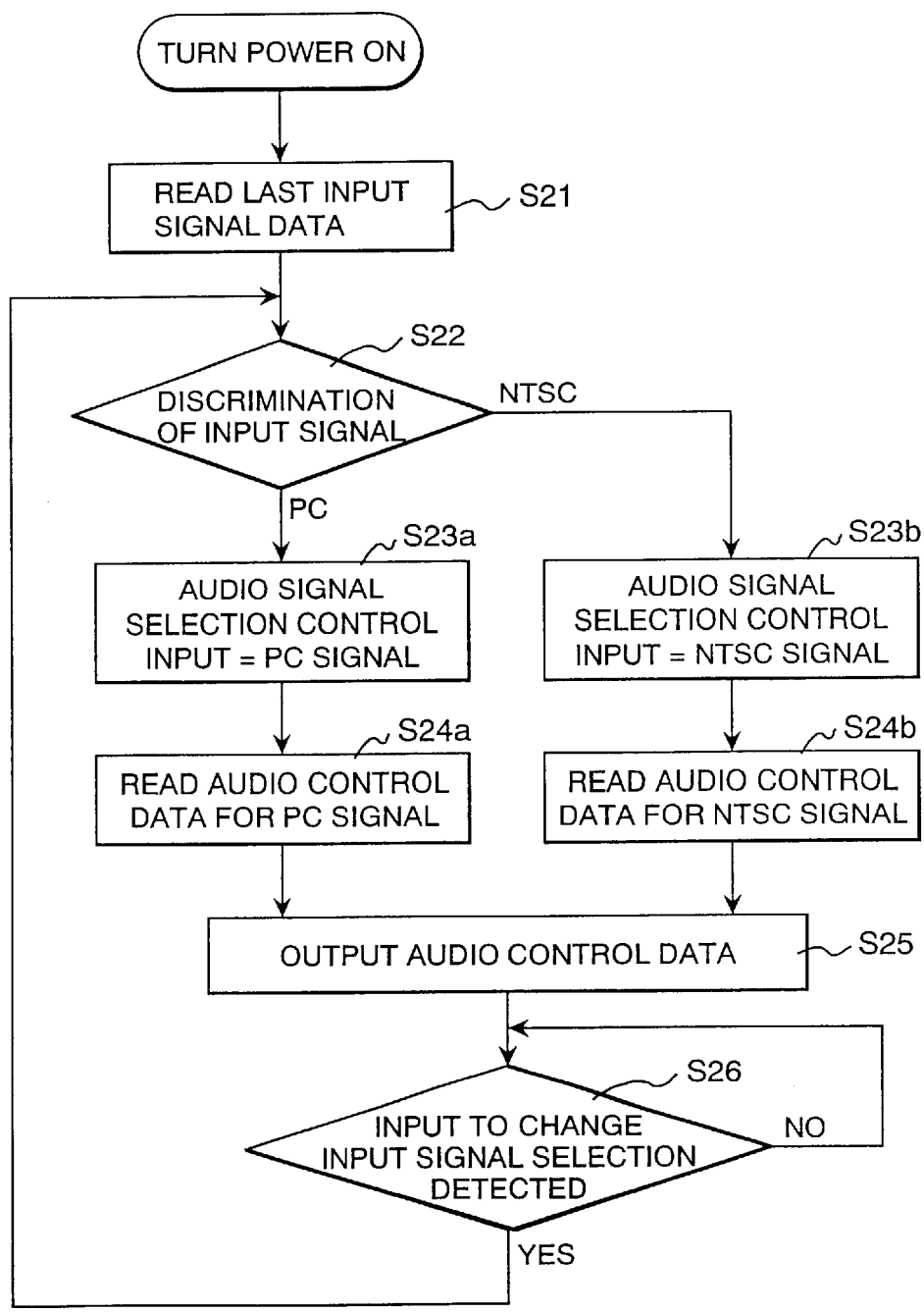
FIG. 3 is a flowchart showing another example of the program for setting the control status of the audio signal control circuit 7.

Next, an example of processing to control the audio signal output status for each selected audio information signal will be specifically described. The processing is performed by a computer program stored in a ROM of the control circuit 12. FIGS. 2 and 3 show examples of processing operations by the program.

FIG. 4 shows an example of a memory map of audio control data stored in the memory circuit 13. In FIG. 4, the memory circuit 13 has a first area in which input signal data is stored, a second area in which audio control data for PC signal is stored, and a third area in which audio control data for NTSC signal is stored. The first area is assigned an address 00H, and the second area is assigned addresses 01H to 0FH. In the second area, the address 01H is an area for volume control data (in PC input), and the addresses 02H to 0FH are reserve areas.

The third area is assigned addresses 10H to 19H. The address 10H is an area for volume control data (in NTSC signal input); the address 11H, an area for high-pitched tone control data; the address 12H, an area for low-pitched tone control data; the address 13H, an area for balance control data; the address 14H, an area for stereo mode control data; the address 15H, an area for surround-sound function control data; and the addresses 16H to 19H, reserve areas.

FIG. 2 is a flowchart showing processing to set the control status of the audio signal control circuit 7. In FIG. 2, a command to change the audio signal output status is inputted from the operation device 11 into the control circuit 12. This input is detected at step S11, and only if a command to change the audio signal output status has been detected, the process proceeds to step S12.

At step S12, it is determined by the control circuit 12 whether an audio signal to be outputted is a personal computer signal or an NTSC signal. As a result, if the output audio signal is a personal computer signal, the process proceeds to step S13b a, while if the output audio signal is an NTSC signal, the process proceeds to step S13b.

At step S13a, audio control data for the audio signal discriminated at step S12 is written into the second area (for audio control data for PC signal) of the memory circuit 13 as shown in FIG. 4, by the control circuit 12. Further, at step S14, the audio control data stored in the memory circuit 13 is outputted as a control command to the audio signal control circuit 7 to change the audio signal output status, by the control circuit 12.

On the other hand, at step S13b, audio control data for the audio signal discriminated at step S12 is written into the third area (for audio control data for NTSC signal) of the memory circuit 13 as shown in FIG. 4, by the control circuit 12. Further, at step S14, the audio control data stored in the memory circuit 13 is outputted as a control command to the audio signal control circuit 7 to change the audio signal output status.

FIG. 3 is a flowchart showing processing to control the output status of the audio signal control circuit 7 for each selected audio information signal.

In FIG. 3, at step S21, when the power is turned on, data selected by the audio signal selection circuit 6 is read by the control circuit 12 from the first area of the memory circuit 13 as shown FIG. 4. Then at step S22, it is determined whether the data is a PC signal input or an NTSC signal input. As a result, if the read data is a PC signal, the process proceeds to step S23a, while the data is an NTSC signal, the process proceeds to step S23b.

At step S23a, a control command is outputted from the control circuit 12 to the audio signal selection circuit 6, so that the audio signal selection circuit 6 selects the PC signal based on the control command. Then at step S24a, audio control 3 data for PC signal is read by the control circuit 12 from the second area of the memory circuit 13 (FIG. 4). Further, process proceeds to step S25, at which the read audio control data is outputted to the audio signal control circuit 7 by the control circuit 12. Then, the process proceeds to step S26.

On the other hand, at step S23b, a control command is outputted from the control circuit 12 to the audio signal selection circuit 6, so that the audio signal selection circuit 6 selects the NTSC signal based on the control command. Next, at step S24b, audio control data for NTSC signal is read by the control circuit 12 from the third area of the memory circuit 13 (FIG. 4). Then at step S25, the read audio control data is outputted as a control command to the audio signal control circuit 7 by the control circuit 12. Then the process proceeds to step S26.

At step S26, existence/absence of input to change the selection by the audio signal selection circuit 6 is determined by the control circuit 12. Only if there has been an input to change the selection by the audio signal selection circuit 6, the process returns to step S22 to repeat the same processing.

As described above, in the embodiment of the present invention, regarding audio information signals inputted in synchronization with image information signals in PC signal and NTSC signal formats different from each other, the audio signal control status for each audio information signal is stored in the memory circuit 13, then, the audio signal control circuit 7 is controlled based on the control data stored in the memory circuit 13. Thus, the audio signal output status can be controlled for each selected audio information signal.

That is, the present invention realizes an image display apparatus which automatically controls the audio signal output status for each of audio information signals inputted in synchronization with image information signals in different signal formats from various different image sources.

The embodiment of the present invention has been described as above, however, the present invention is not limited to the above embodiment. For example, in the embodiment, the input signals are PC signal and NTSC signal, however, a television signal in another system (e.g., an HDTV system television signal) may be used. Further, other image information signals with audio information signals other than the television and personal computer signals may be used.

Further, in the above embodiment, the input signals are two PC signal and NTSC signal, however, the number of input signals may be three or more.

As a case to which the present invention is applied, other than switching between television broadcast and personal computer in ordinary households, switching between still image (an image from PC for detailed explanation of product) display and moving image (an NTSC signal used for demonstration of product or the like) display in a showroom or in counter operations.

As described above, the present invention realizes an image display apparatus capable of automatically controlling the audio signal output status for each of audio information signals inputted in synchronization with image information signals (a plurality of image information signals outputted from different signal sources) in different signal formats.

This removes the inconvenience to set the audio signal output status for each selection of image input signal, and improves the operability of image display apparatus capable of selecting one of image information signals in different signal formats and performing display and audio output based on the selected image information signal.

As other embodiments than the above-described embodiment of the present invention can be made without departing from the spirit and the subject matter thereof, accordingly, the foregoing description of the embodiment has been given for illustrative purposes only and not to be construed as imposing any limitation in every respect. The scope of the invention is, therefore, to be determined solely by the following claims and changes and modifications made within a scope equivalent to the scope of the claims fall within the true spirit and scope of the invention.

What is claimed is:

1. An image display apparatus which inputs a first image information signal and a second image information signal in a signal format different from that of said first image information signal, and displays an image based on at least one of said first and second image information signals, comprising:

an audio signal selection circuit that selects and outputs one of a first audio information signal inputted with said first image information signal and a second audio information signal inputted with said second image information signal;

an audio control circuit, connected to said audio signal selection circuit, that controls an audio output status for the audio information signal outputted from said audio signal selection circuit, and outputs the audio information signal to an audio output unit;

a memory circuit that is used for storing first control data for outputting said first audio information signal in a first audio output status, and second control data for outputting said second audio information signal in a second audio output status having a sound effect different than that of said first audio output status; and a controller, connected to said memory circuit and said audio control circuit, that reads and supplies either one of said first control data and said second control data from said memory circuit to said audio control circuit, wherein said controller reads out and supplies said first control data from said memory circuit to said audio control circuit if said audio selection circuit outputs said first audio information signal, and reads out and supplies said second control data from said memory circuit to said audio control circuit, if said audio selection circuit outputs said second audio information signal, and wherein said audio control circuit controls said first audio information signal to be in said first audio output status based on said first control data supplied from said controller, and controls said second audio information signal to be in said second audio output status based on said second control data.

2. The image display apparatus according to claim 1, wherein said first image information signal and said first audio information signal are signals output from a personal computer, and said second image information signal and said second audio information signal is included in a television broadcast signal.

3. The image display apparatus, as described in claim 1, wherein said audio signal selection circuit selects one of said first audio signal and said second audio signal in response to a user's instruction.

4. The image display apparatus, as described in claim 1, wherein said second control data stored in said memory includes at least one of high-pitched tone control data, low-pitched tone control data, balance control data, stereo mode control data, and surround-sound function control data.

* * * * *